United States Patent

[11] 3,621,246

| [72] | Inventors | William C. Horsey<br>Baltimore;<br>Robert H. Samson, Pasadena; Don O. McCauley, Glen Burnie, all of Md. |
|---|---|---|
| [21] | Appl. No. | 71,931 |
| [22] | Filed | Sept. 14, 1970 |
| [45] | Patented | Nov. 16, 1971 |
| [73] | Assignee | Westinghouse Electric Corporation<br>Pittsburgh, Pa. |

[54] X-RAY TIRE INSPECTION APPARATUS
10 Claims, 8 Drawing Figs.

[52] U.S. Cl.................................................. 250/52,
    73/146, 178/DIG. 5, 250/53, 250/83.3 D, 250/92
[51] Int. Cl..................................................G03b 41/16
[50] Field of Search.......................................... 73/146;
    178/DIG. 5; 250/52, 53, 83.3 D, 91, 92

[56]         References Cited
             UNITED STATES PATENTS
2,301,251   11/1942   Capen......................... 250/52
3,550,443   12/1970   Sherkin....................... 73/146

*Primary Examiner*—Anthony L. Birch
*Attorneys*—F. H. Henson, E. P. Klipfel and D. F. Straitiff ABSTRACT: Apparatus for the complete X-ray inspection of a tire is described. Power-operated spindles arranged oppositely along an open-ended clearanceway in a supporting frame, spread the beads of the tire and rotate it about its center. An angulated X-ray tube on one end of a curved inspection arm directs an X-ray beam into the opening between the tire beads in direct alignment toward an image amplifier tube and TV camera assembly on the opposite end of the inspection arm at the tire's exterior. An L-shaped pivot support arm for the inspection arm provides for aiming the X-ray beam at different angles into the tire from one bead to the other, while the image tube is maintained in direct alignment with such beam. A TV monitor produces visible images responsively to output from the TV camera on the inspection arm.

X-RAY TIRE INSPECTION APPARATUS

BACKGROUND OF THE INVENTION

1. Field of the Invention

The invention relates to the field of X-ray tire inspection, and more particularly to X-ray inspection of a tire while removed from any wheel on which it subsequently may be used and without transmission of X-rays through more than one tire-wall thickness at any one time.

2. Description of the Related Art

While the field of X-ray inspection of tires prior to use is yet to be developed to a significant extent, prior apparatuses heretofore proposed for performing such inspection have been characterized, for example, by lack of ability to X-ray scan the tire wall from bead to bead without simultaneously passing the X-ray beam through two wall thicknesses and/or by lack of ability to maintain the image tube squarely aligned with the X-ray beam, which tends to confuse the image and/or obscure the inspection information being sought; by the necessity for complex manipulation of the tire; by inability to accommodate tires of different sizes; and/or by employment of a number of X-ray tubes, which tends to further complicate the apparatus.

SUMMARY OF THE INVENTION

The X-ray tire inspection apparatus of the present invention overcomes the above limitations of previous apparatus by the directing of an X-ray beam at different angles between the beads into the interior of the tire toward an exterior X-ray imaging means automatically maintained aligned with such beam. As the tire is rotated on its axis, circumferential scanning of the tire results for each angulated position of the X-ray beam. Ultimately complete single-wall-thickness X-ray inspection of the tire is realized from bead to bead.

By use of a pivotally supported suitably angulated inspection arm and X-ray tube assembly capable of swinging around the exterior of the tire in the bead-to-bead direction about a single pivot point, the change in angulation of the X-ray beam is easily obtained, as well as automatic alignment of the imaging means carried at the opposite end of the arm, while at the same time affording opportunity for the inspection arm to be so positioned initially as to afford opportunity for the tire to be introduced to the bead-spreading and tire-rotating spindles during inspection setup, without interference by such arm, the X-ray source, or imaging means mounted thereon.

By virtue of suitable disposition of such spindles and construction of the supporting frame, an open-ended clearanceway is provided which accommodates the swinging movement of the inspection arm and equipment thereon between such arms, thereby enabling the tire to be mounted adjacent to such arms, with consequent saving in space, and enabling complete bead-to-bead inspection of the tire without requiring a removal and sidewall reversal on the spindles.

By use of an L-shaped arm pivot-mounted arm for support of the inspection arm, the pivot point for inspection arm movement can be located near the tire beads while support for the inspection arm lies outside the tire to permit movement therearound.

By virtue of use of an image amplifier tube and TV camera assembly as the imaging means, remote viewing by TV monitor is afforded with a high degree of sensitivity and image control.

By virtue of use of radially adjustable spindles and pivot-position-adjustable mounting means for the inspection arm, different sized tires can be accommodated by the apparatus.

By employment of a relatively small water-colled X-ray tubehead as the X-ray source on the C-arm, relatively small diameter tires as well as large diameter tires can be accommodated.

By providing for adjustably positioning of the imaging means and the X-ray tube one relative to the other and each relative to the pivotal support location for inspection arm, a high degree of operational flexibility is afforded.

By employment of motorized means for effecting position adjustments and a TV monitor for viewing output from the TV camera, complete inspection of the tire can be effected and controlled from a radiation-protected inspection booth.

BRIEF DESCRIPTION OF THE DRAWING

The novel and distinctive features of this invention are set forth in the claims appended to the specification. The invention itself, however, together with further features and advantages thereof may best be understood by reference to the following description and accompanying drawings, in which:

DESCRIPTION OF THE PREFERRED EMBODIMENT

Figure 1:
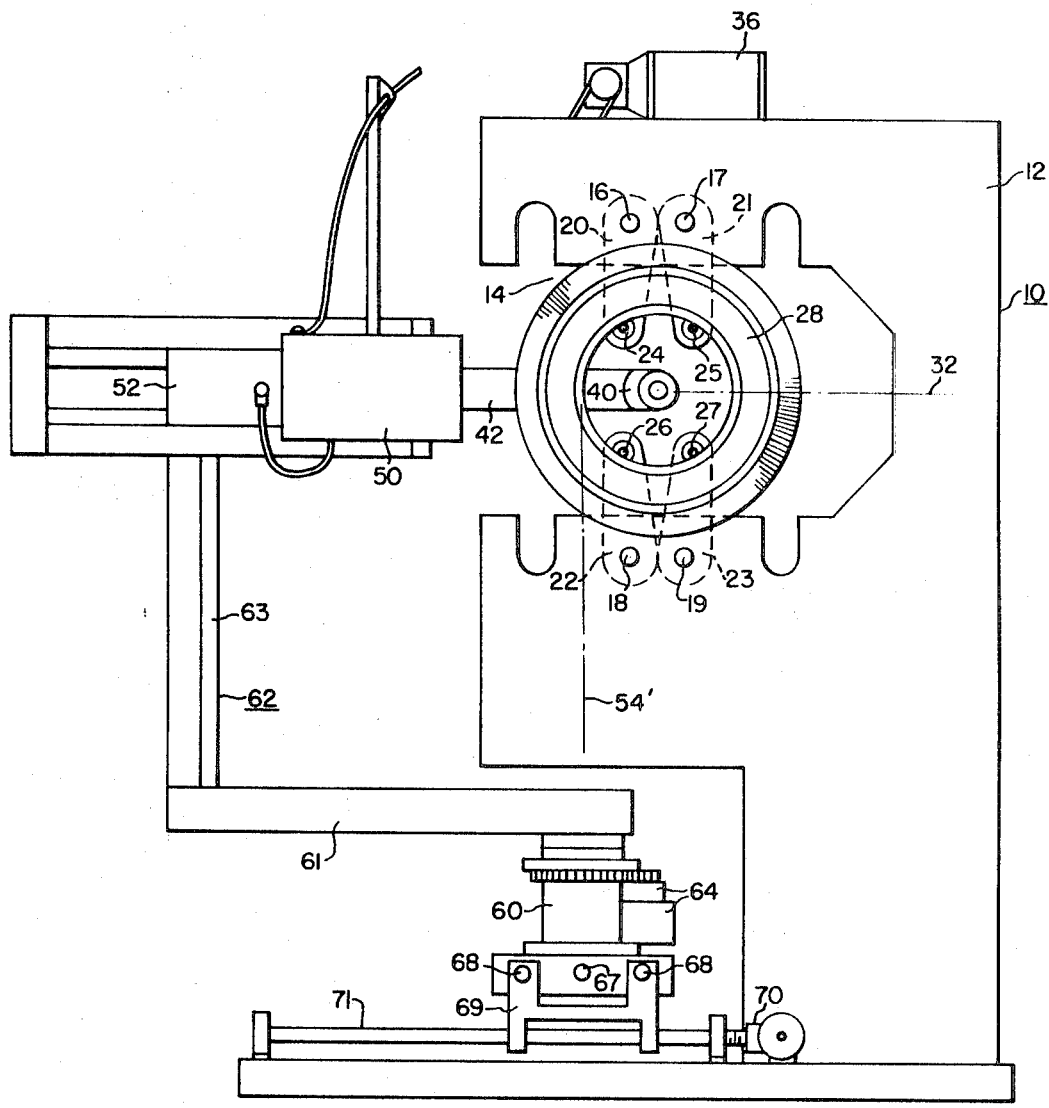
FIG. 1 is a front elevation outline view of an exemplification of an X-ray tire inspection machine embodying novel features of the present invention.
Figure 2:
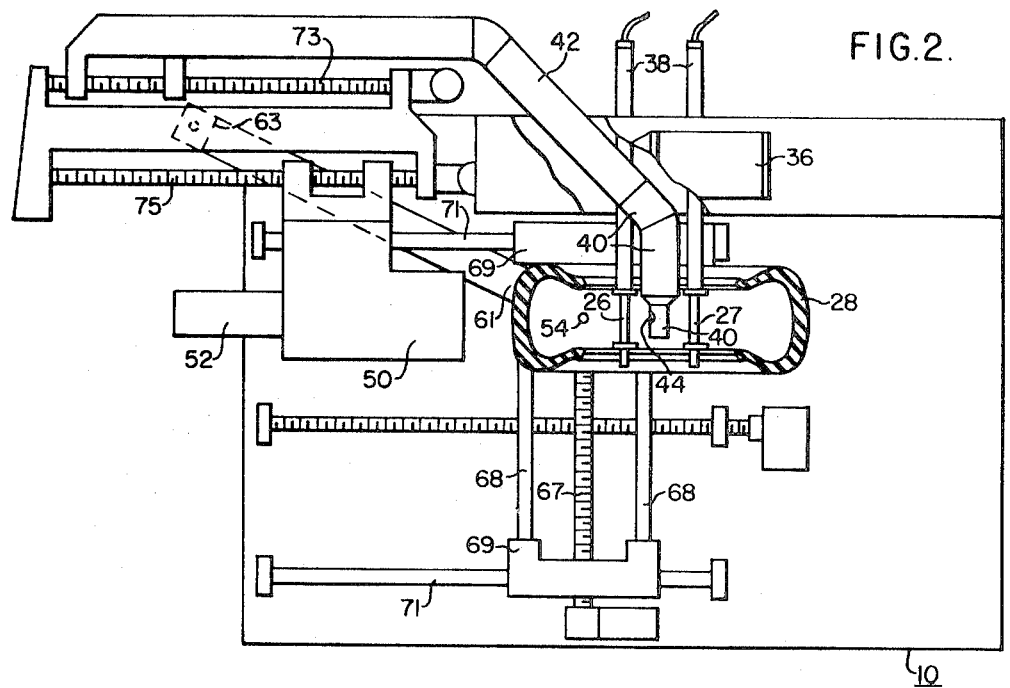
FIG. 2 is a top view, substantially in outline, of the tire inspection of FIG. 1.
Figure 5:
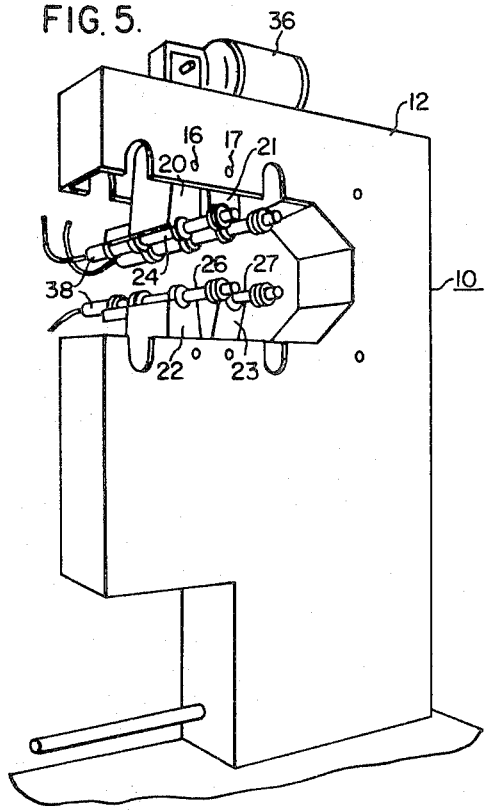
FIGS. 5 and 6 are front elevation views in perspective, showing two extreme positions, respectively, of tire-size-adjustable spindles employed in the machine of FIGS. 1 and 2.
Figure 6:
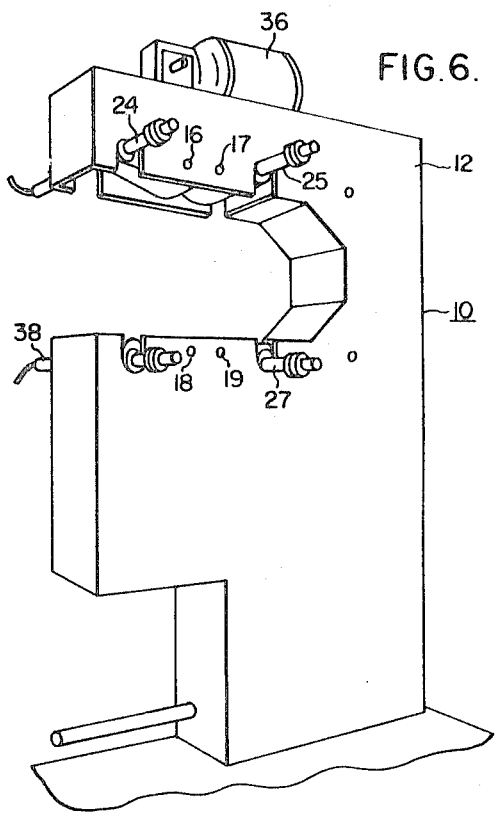

Referring to FIGS. 1 and 2, the novel tire inspection machine 10 shown therein comprises an upright generally rectangular frame and housing assembly 12 having a horizontal open-ended slot or clearanceway 14 opening inwardly from its left side, as viewed in FIG. 1, and which extends through such frame and housing assembly from front to back. Pivotally supported at shafts 16 and 17 above clearanceway 14 and at shafts 18 and 19 below such clearanceway through the medium of arm assemblies 20, 21 and 22, 23, are two pairs of rotatable, axially expandible spindle assemblies 24, 25 and 26, 27 for rotarily supporting and expanding the beads of a tire 28 in a vertical attitude parallel to the front of the housing 10 with the center of the tire aligned with a horizontal plane 32 located midway between top and bottom of clearanceway 14. The two top spindle assemblies 24 and 25 are rotatable by a motor 36, in a manner to be described in detail hereinafter, to cause the tire 28 to rotate about its center in a bead-spreaded state. Fluid pressure operated cylinders 38 at the rear of the housing 12 provide for expansion of the spindle assemblies to obtain the bead-spreading function. FIGS. 5 and 6 depict two extreme angular positions of arm assemblies 20, 21, 22 and 23 for disposition of the spindle assemblies 24, 25, 26 and 27 to accommodate different sized tires.

Referring again to FIGS. 1 and 2, a small water-cooled X-ray tube 40 is carried on one end of a horizontal curved inspection arm 42 for disposition in the tire opening with its exit window 44 aimed to project an X-ray beam 46 (FIG. 3) horizontally between the tire beads toward the tire interior and the input screen of an image amplifier tube 50 carried on the opposite end of the arm 42 at the exterior of the tire 28. A TV camera 52 affiliated with the output screen of such image amplifier tube is coupled to a TV monitor (not shown) at a remote location for depicting the images of the internal tire wall construction irradiated by the X-ray beam.

Figure 3:
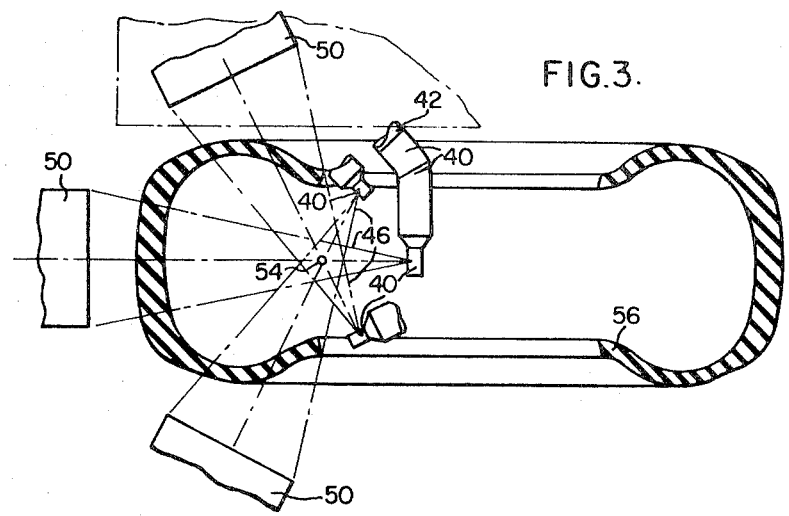
FIG. 3 is a schematic showing of angulation of the inspection arm in the machine of FIGS. 1 and 2, relative to a tire cross section.

Referring to FIGS. 1, 2 and 3, as the tire is being rotated on the spindles 24, 25, 26 and 27, the X-ray beam 46 will be aimed at different internal wall areas after each successive one of a number of complete revolutions until the entire wall area of the tire has been scanned by the beam for a complete X-ray examination of the tire. By movement of the X-ray tube 40 about a pivot point 54 located substantially midway between the tire beads 56, as shown in FIG. 3, such complete wall inspection can be effectuated without passing the beam through more than one tire wall thickness at any one time. Such movement of the X-ray tube about such as pivot point 54 in FIG. 3 is effectuated by movement of the inspection arm 42 about such point, thereby maintaining the image amplifier tube 50 and TV camera 52 aligned with the X-ray beam 46 at all angles of the X-ray tube.

To enable such pivot point 54 to be established at a location such as between the tire beads 56 with minimal interference to mounting of the tire onto the spindles during setup and swinging of the inspection arm 42 during use of the machine, such pivot point is defined by a rotary joint 60, FIG. 1, at the end of a horizontal leg 61 of an L-shaped support arm 62 having the top of its upright leg 63 in supporting connection with the inspection arm 42. The inspection arm 42 and the L-shaped support arm 62 turn in unison about the rotary joint 60 which defines the pivot point 54, FIGS. 2 and 3. The pivot point 54 is vertically aligned with the rotary joint 60 along an axis 54' shown in FIG. 1. For power actuation of the rotary joint 60 to obtain the aforedescribed angulation of the inspection arm 42 and enable effectuation thereof from a remote station, an inspection arm actuation motor and gear assembly 64 is provided.

Figure 4:
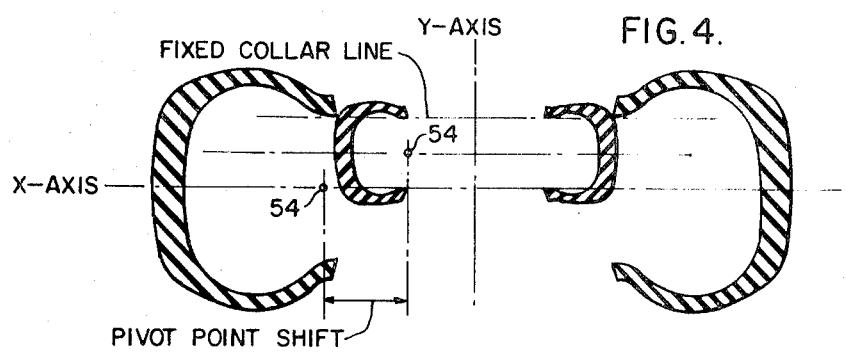
FIG. 4 is a similar representation, showing a shift in pivot point for angulation of the inspection arm which may be effectuated to accommodate different sized tires.

Referring to FIGS. 1, 2 and 4, to enable the pivot point 54 to be shifted in a Y-direction to suit different internal diameters of tires and in an X-direction to suit different tire section widths, the rotary joint 60 is mounted on an X-direction adjusting carriage 66 movable by operation of motor-operated screw-threaded shaft 67 along support and guide rails 68 carried on a Y-direction adjusting carriage 69 which includes such shaft 67 and rails 68 and is movable by a motor-operated screw-threaded shaft 70 along support and guide rails 71.

To enable the X-ray tube to be adjusted relative to the pivot point 54, the arm 42 is suitably mounted for horizontal movement at the top of the leg 63 of L-shaped support arm 62 by such as a motorized screw-threaded shaft 73, and the image amplifier tube 50 and TV camera 52 mounted thereon are similarly mounted for movement relative to pivot point 54 by such as a motorized screw-threaded shaft 75. Such position adjustment for X-ray tube 40 and image amplifier tube 50 serve to accommodate different tire sizes and operating techniques, such a certain degree of image magnification control, for example.

Certain protective features aimed at preventing damage to the X-ray tube 40 and the image amplifier tube 50 during actuation by any of the several selective modes have been embodied in a working model of the inspection machine of the present invention, but such features are deemed to be sufficiently subservient to the salient features described herein as to warrant omission from the present specification in behalf of brevity.

Figure 8:
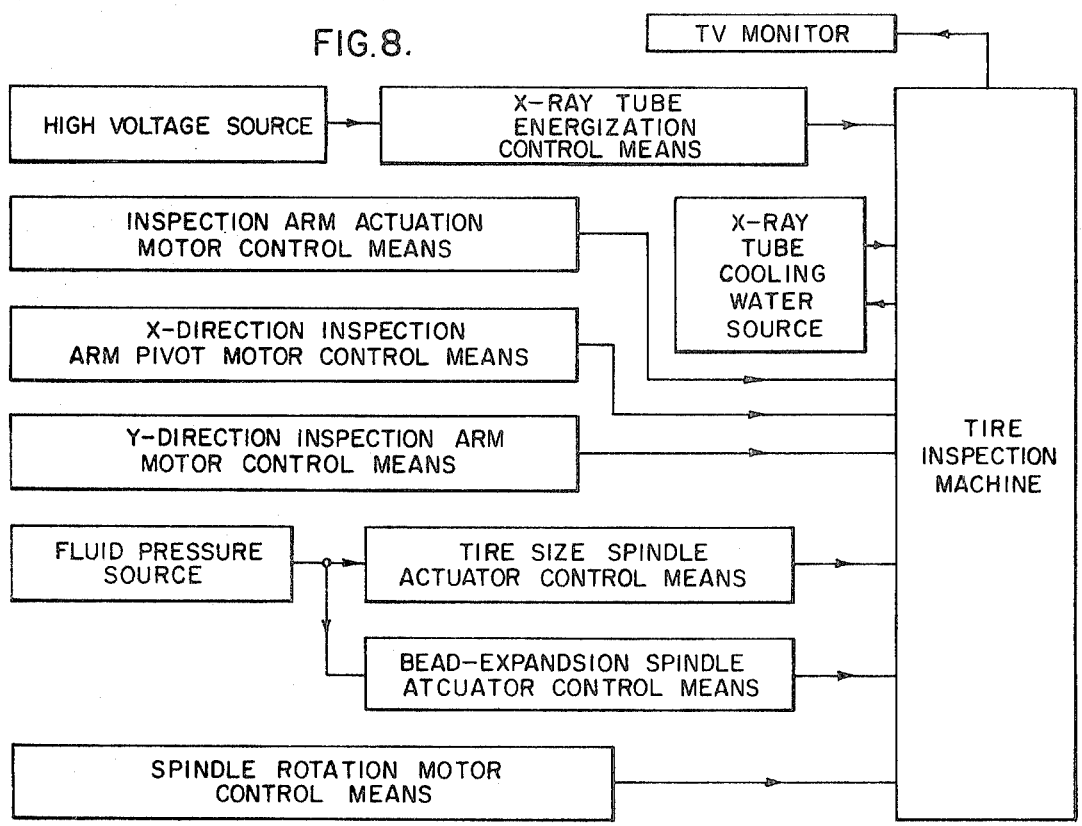
FIG. 8 is a block diagram of a complete tire inspection system embodying the invention.

A self-explanatory block diagram of the major components of the overall inspection system, including the novel tire inspection machine of FIGS. 1 and 2, is shown in FIG. 8.

Figure 7:
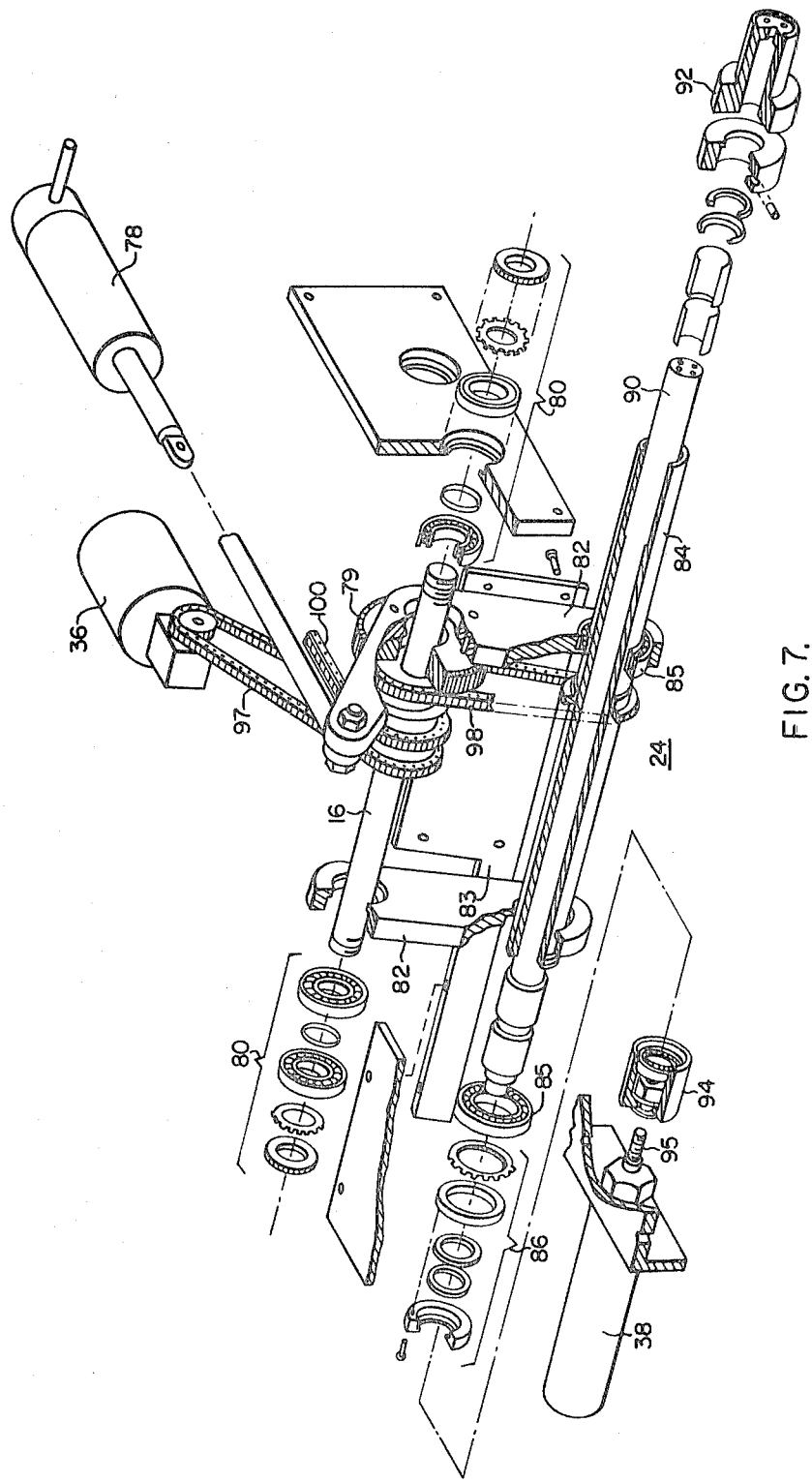
FIG. 7 is an exploded perspective view showing details of one of the tire-size-adjustable spindles of FIGS. 5 and 6.

A detailed exemplification of a suitable construction for a power rotated one of the expandable spindle assemblies, assembly 24, is shown in 1), FIG. 7. The arm assembly 20 is rockable about the shaft 16 through the medium of a crank arm 77 actuated by a fluid pressure operated tire-size-spindle-adjustment actuator 78 which is mounted in the housing 12 and connected to all four spindle arm assemblies 20, 21, 22 and 23 by suitable linkage, not shown, and arm interconnection gears 79 in each arm assembly that transmit angulation of one arm to the adjacent arm. Each arm assembly includes roller bearing and end locking assemblies 80 FIG. 7 for its respective pivot shaft 16, 17, 18, 19 (FIG. 1), as well as two axially spaced-apart radial arm members 82 rotatable about such respective pivot shaft, and cover members 83 (only one of which is shown) spanning such arm members at opposite sides. Each expandable spindle assembly 24, 25, 26 and 27, includes an outer axially fixed rotatable sleeve member 84 rotatably supported by ball bearings 85 in the projecting ends of the arm members 82 and secured against axial movement by locking means 86 screw-threaded and locked onto one end of such sleeve member. The outer end of axially fixed, rotatable sleeve member 84 carries a collar 88 which is secured thereto to occupy an axially fixed position at the front of housing 12 (FIGS. 1 and 2). An axially movable, rotatable shaft 90 extending slidably through sleeve member 84 including collar 88 carries a movable collar 92 at its front end and a rotary thrust bearing 94 secured to the output shaft 95 of a fluid pressure bead-expansion actuator cylinder 38. By pressurization of such cylinder, the shaft 90 slides inwardly through the sleeve member 84 to move the collar 92 away from the collar 88 while between the beads of a tire to provide the rotary bead-spreading support of a tire as aforementioned.

The spindle assembly 24 is power rotated by the motor 36 atop the housing 12 of the inspection machine by way of a chain 97 rotatably similarly the output from such motor to the shaft 16 via the usual sprockets, and a chain 98 rotatably coupling the shaft 16 to the sleeve member 84 via the usual sprockets to provide for rotation of the collar 88 to impart turning of the tire 28 (FIGS. 1 and 2) via its bead engaging such collar. By virtue of extension of the drive chain along the arm assembly between shaft 16 and sleeve member 84, such drive connection is not disturbed by angulation of arm assembly 20 to different positions about such shaft. The motor 36 serves to also similarly rotate the corresponding sleeve member 84 of the adjacent spindle arm assembly 21 (FIG. 1) through the medium of sprockets and one horizontal chain 100 rotatably interconnecting the pivotal drive shafts 16 and 17 together, and a respective chain 98 extending along such arm assembly.

Having now described an illustrative embodiment of the invention, what is claimed as new and desired to be secured by Letters Patent in the United States is:

1. Apparatus for the complete X-ray inspection of a tire, said apparatus comprising:
   a supporting frame having an open-ended clearanceway therein,
   power-operated spindles arranged along opposite edges of said clearanceway for rotatably supporting and spreading the beads of a tire on an axis passing through such clearanceway,
   a curved inspection arm extending through such clearanceway from a region constituting the open center of a tire to a peripheral region thereof,
   an X-ray tube mounted on the tire center end of such inspection arm,
   an X-ray imaging means mounted on the tire exterior end of such inspection arm,
   said X-ray tube having an X-ray beam exit window facing such imaging means and said imaging means being squarely aligned with the axis of said exit window beam; and
   a pivot support means for said inspection arm to permit movement thereof about a pivot point for aiming of such X-ray beam into the tire at different angles from one bead to the other while maintaining perpendicular registry of said imaging means with said beam.

2. X-ray tire inspection apparatus as set forth in claim 1, wherein:
   said X-ray imaging means includes an image amplifier tube having a flat input screen maintained perpendicular to the axis of the X-ray beam exiting said X-ray tube.

3. X-ray tire inspection apparatus as set forth in claim 2, wherein,
   said imaging means further comprises a TV camera affiliated with the output screen of said image amplifier tube, and
   said apparatus includes a TV monitor for producing a visible image responsive to the output from said TV camera.

4. X-ray tire inspection apparatus as set forth in claim 1, wherein,
   said power-operated spindles are adjustable to accommodate different tire sizes, and said pivot support means is adjustable to permit relocation of the pivot point about which said inspection arm moves commensurate with different tire sizes.

5. X-ray tire inspection apparatus of as set forth in claim 1, wherein said pivot point is located to lie substantially midway between the tire beads.

6. X-ray tire inspection apparatus as set forth in claim 1, wherein, said pivot point support means is in the form of an L-shaped support arm supported at the end of one leg by a rotary joint having an axis aligned with a region in the vicinity of the tire beads, and the other leg of such arm supports said inspection arm in extension perpendicularly thereto.

7. X-ray tire inspection apparatus as set forth in claim 6, wherein a motor means is provided for power actuation of said rotary joint.

8. X-ray tire inspection apparatus as set forth in claim 1, wherein, said X-ray tube and said X-ray imaging means are adjustably mounted on said inspection arm for repositioning relative to the aforesaid pivot point about which said arm turns.

9. X-ray tire inspection apparatus of claim 8, wherein motor means are employed for effecting said repositioning.

10. X-ray tire inspection apparatus as set forth in claim 1, further comprising, a source of high voltage for energization of said X-ray tube, and control means for such energization.

* * * * *